Patented June 24, 1941

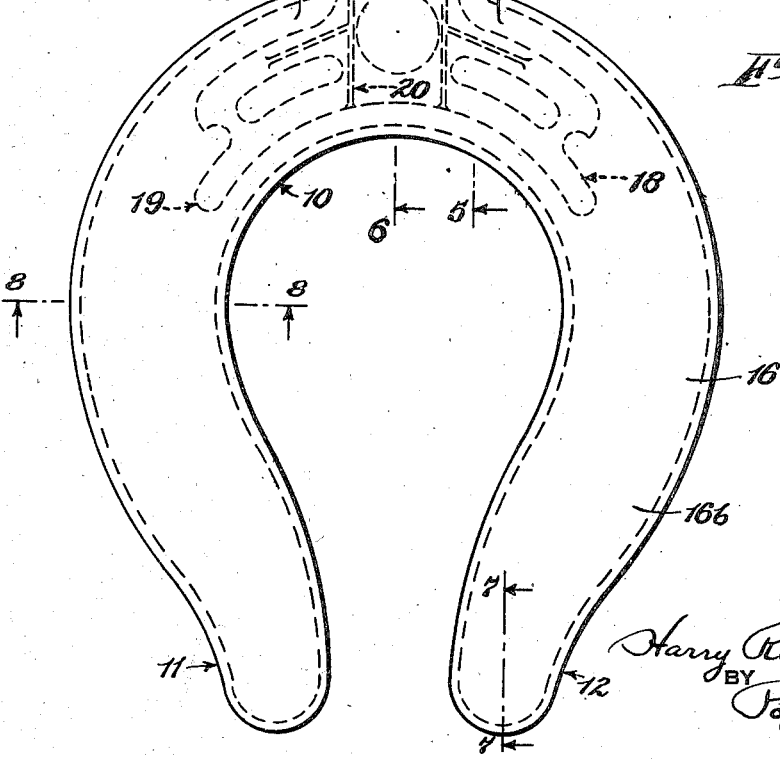

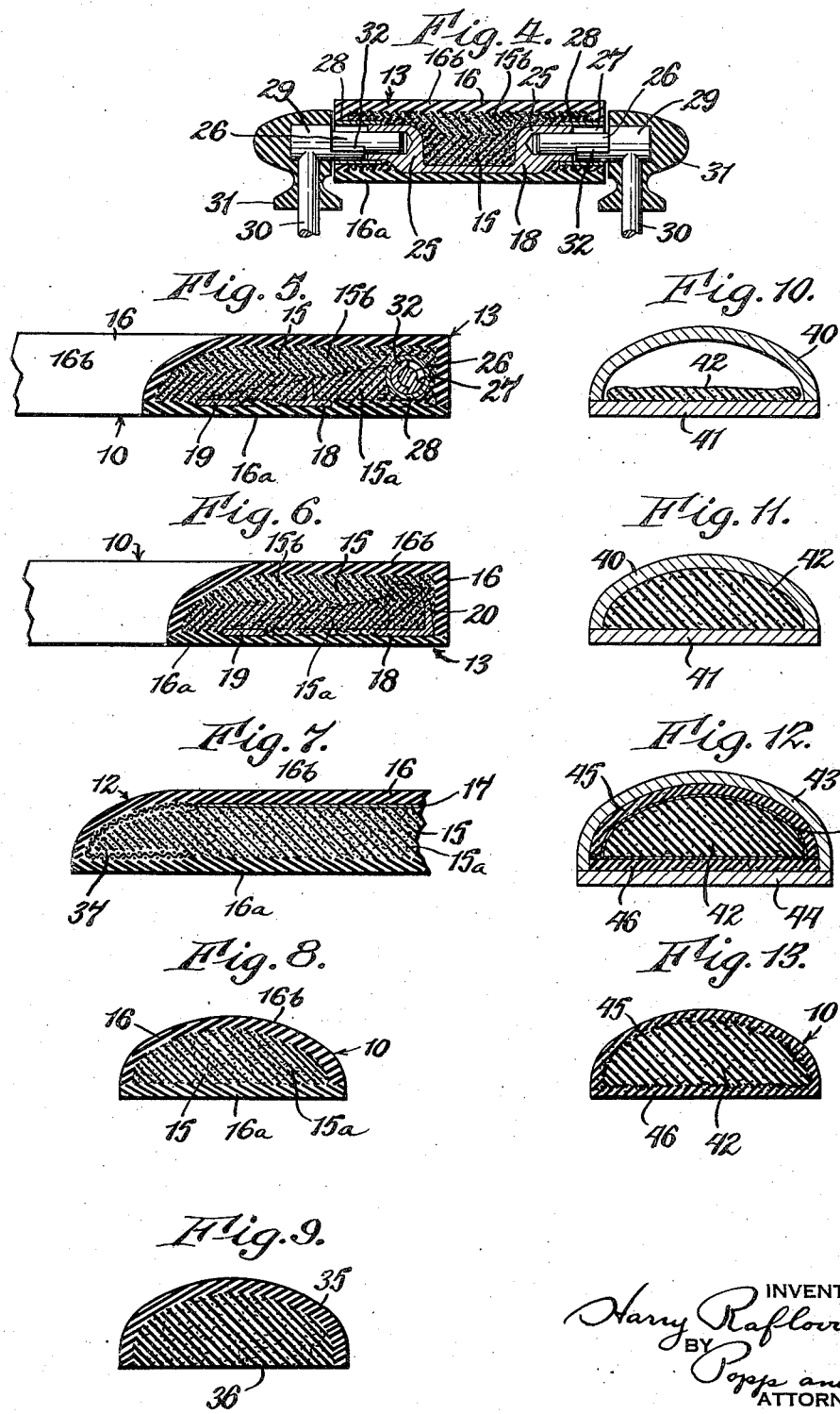

2,247,337

UNITED STATES PATENT OFFICE 2,247,337

PROCESS OF MAKING RUBBER ARTICLES

Harry Raflovich, Detroit, Mich.

Application December 9, 1937, Serial No. 178,979

4 Claims. (Cl. 18—53)

This invention relates to a rubber article and process of making the same and while the process forming the subject of my invention can be used for making a wide range of rubber articles, the invention is illustrated as embodied in a toilet seat composed principally of rubber, vulcanized by heat and having a metal reinforcing member which also forms a part of the means for hinging the seat.

This application is a continuation in part of my copending United States application for Process of making rubber articles, Serial No. 732,830, filed June 28, 1934.

One of the objects of the invention is the production of such articles of greater uniformity of composition and superior properties and a greater ease and economy in manufacture.

Another object is a composition of matter for use in the manufacture of vulcanized blown rubber articles, which composition includes unvulcanized or raw rubber in solid form, preferably smoked sheet rubber and a blowing agent heretofore never used with rubber compositions that must be subjected to the relatively high temperatures required to effect vulcanization of unvulcanized rubber by heat. This composition is simultaneously molded, blown and vulcanized by the application of heat and may contain a high percentage of fillers as may be desired. The specific blowing agent employed in the heat vulcanization process also permits more accurate control of the process.

Another object of the present invention is to provide a rubber article composed of a relatively soft sponge rubber core encased by an integral rubber shell of denser texture, the use of the sponge rubber core reducing the amount of rubber employed and the weight of the article and also imparting resiliency and noiseless properties. The case or shell can be either made of hard rubber or can also be made of sponge rubber and if made of sponge rubber preferably has a higher percentage of the blowing agent incorporated therein and is so formed that while having a very finely porous internal structure it has a dense and non-porous surface which, by proper molding, has a smooth and shiny appearance without special polishing.

Another object of the invention is to provide such a sponge rubber core encased by a denser rubber in which the blowing of the core and the vulcanization of the core and case and their vulcanization to one another is accomplished by a simple molding operation.

Another object of the invention is to provide a rubber article and method of making the same in which any desired metallic reinforcement can be embedded in or applied to the rubber before vulcanization and molding, the rubber vulcanizing to said metal reinforcement and a firm union being obtained therewith.

Another object of the present invention is to provide simple means for preventing the accidental escape of the blown rubber to the exterior of the article at extremities of the mold.

Another object of the invention is to provide such an article which is built up of unvulcanized rubber sheets, such sheets being readily cut to any desired form and being readily joined to one another to provide the blank.

Another object of the invention is to provide a method of molding rubber articles which permits the sponge rubber core and the case to be located in any manner desired.

Another aim of the present invention is to provide a rubber article which can be produced in any desired color, particularly the more delicate or so-called pastel shades, thereby permitting articles, such as toilet seats, to be made to harmonize with other fixtures.

In the accompanying drawings:

Fig. 1 is a perspective view of a rubber toilet seat blank preparatory to its being placed in a mold.

Fig. 2 is a vertical cross section through the two parts of a steam jacketed mold showing the blank in place therein.

Fig. 3 is a top plan view of a toilet seat embodying my invention.

Figs. 4–8 are vertical sections, taken on the correspondingly numbered lines on Fig. 2.

Fig. 9 is a view similar to Fig. 8 showing a modified form of my invention.

Figs. 10–13 are cross sections, through the molds used in carrying out a modified form of my invention, Fig. 10 showing an unvulcanized sheet placed in a small core mold; Fig. 11 showing this core blown and partly vulcanized; Fig. 12 showing the blown and partly vulcanized core placed in a larger mold and encased in unvulcanized sheets of rubber also having a blowing agent and Fig. 13 showing the finished article produced by the steps illustrated in Figs. 10–12.

The invention is illustrated in connection with a toilet seat having a rounded seat portion 10 and forwardly projecting horns or extensions 11 and 12 although it will be understood that the invention can be carried out with a wide range of other rubber articles. At its rear the toilet seat is formed to provide a rearward extension 13 carrying the means whereby the seat is hinged.

In the form of the invention shown in Figs. 1–9, the toilet seat is composed of a soft sponge rubber core 15 which can be completely encased in a hard rubber shell or casing 16, the core and shell being vulcanized to one another. If desired sheets of insulating material, such as a sheet of asbestos 17, can be incorporated in the seat near the top layer to impart heat insulating properties. In order to strengthen the toilet seat a metal reinforcing member indicated generally at 18 is embedded in the sponge rubber core, this reinforcing member comprising a metal plate arranged at the rear of the toilet seat and having flat arms 19 extending toward the horns 11 and 12 and reinforced by ribs 20. At its rear this reinforcing member 18 is formed to provide a pair of bosses 25 carrying pins 26 each having a stop shoulder 27 along one side. Each of these bosses 25 also carries a sleeve 28 embedded in the rubber and the pins 26 extend outwardly from the sleeves 28 and are journaled in bearings 29 of fittings 30 secured to the rear of the water closet bowl (not shown). The fittings 30 can be suitably encased with rubber 31 for decorative purposes and each bearing 29 includes an extension 32 fitting into the corresponding sleeve 28 and engaging the stop shoulder 27 of the corresponding pin 26. The stop shoulders 27 and 32 coact to limit the rearward movement of the toilet seat.

The modified form of the invention shown in Fig. 9 is the same as that shown in Figs. 1–8 except that the hard rubber casing 35 only extends around the top of the sponge rubber core 36 instead of completely around this core, as shown in Figs. 1–8.

In making toilet seats in accordance with my invention it is desirable to make them of different colors to harmonize with the bathroom fittings. Heretofore it has been impossible to provide such colors except in very dark shades and it is one of the objects of the invention to provide rubber articles, such as toilet seats, of delicate or so-called pastel shades. The principal difficulty is that with the high temperatures used in vulcanizing the rubber the light colors grey and are not stable. I have found that by employing zinc sulfide, whiting, magnesia or any other white filler, mineral rubber colors of delicate shades can be employed and will not grey during vulcanization. In making the composition for the hard rubber case formed as shown in Figs. 1–9 I prefer to employ the following ingredients:

| | |
|---|---|
| Rubber (smoked sheet) | pounds 25 |
| Mineral rubber color | do 8 |
| Zinc sulfide, whiting, or magnesia | do 8 |
| Sulfur | do 12½ |
| Accelerator | ounces 3½ to 4 |
| Oil | pounds 1½ |

In making black or dark colored toilet seats additional fillers in the form of reclaimed rubber can be employed as well as limestone and lampblack.

The above batch is kneaded and rolled into a sheet. From this sheet is cut out a blank 16a of the general form of the toilet seat and a similar blank 16b.

The sponge rubber core is preferably first made by preparing a master batch in the form of a paste by thoroughly mixing and kneading together in a suitable mill the following constituents substantially in the proportions shown:

| | |
|---|---|
| Rubber (smoked sheet) | pounds 2 |
| Yeast (commercial dry yeast) | do 1 to 4 |
| Soda (bicarbonate) | do 0 to 4 |
| Petrolatum (Vaseline) | ounces 4 to 12 |
| Oil (various mineral and vegetable) | do 4 to 12 |
| Sulfur (flowers) | do 1 to 6 |

When the master batch has been thoroughly mixed to a uniform homogeneous mass, a small amount, about one-quarter of the above, is incorporated with the following:

| | |
|---|---|
| Rubber (smoked sheet) | pounds 10 |
| Dixie clay | do 1 to 5 |
| Zinc white | do 1 to 5 |
| Sulfur (flowers) | do 3½ to 7 |
| Soft lampblack | do ½ to 1½ |
| Oil (various mineral and vegetable) | do ½ to 2 |
| Petrolatum (Vaseline) | ounces 2 to 6 |

This produces a batch which is then rolled into a sheet and a blank 15a cut therefrom. This blank is of the general shape of the blanks 16a and 16b but smaller and is sandwiched between the blanks 16a and 16b, as illustrated in Fig. 1, overlaying the reinforcing member 18. In order to secure greater pressure against the reinforcing member 18 and a firm union therewith, an additional small blank 15b is placed over the blank 15a where this blank 15a overlays the reinforcing member 18, as best illustrated in Figs. 4, 5 and 6.

If heat insulating properties are desired the sheet of asbestos 17 is provided. This sheet is of the same general shape as the toilet seat and is interposed between the layers 15a and 15b which form the sponge rubber core and the top sheet 16b which forms the top of the shell.

In order to prevent the blank 15a from flowing to the exterior of the seat at the extremities 11 and 12 of the toilet seat, means are preferably provided for confining the sponge rubber at these places. These means comprise small pieces of cloth 37 which are wrapped around the extremities of the sheet 15a, as best illustrated in Figs. 1 and 7. After the blank is built up as shown in Fig. 1, the edges of the sheets 16a and 16b are pressed together, as best illustrated in Fig. 2, these sheets being quite tacky. The blank is then placed in a mold composed of a lower relatively flat section 40 which is steam jacketed, as indicated at 41, and an upper section 42 which is steam jacketed, as indicated at 43. These mold sections, of course, conform interiorly to the desired external form of the toilet seat and are held together in any suitable manner. Steam at 80 or 90 pounds' pressure is then introduced into the jacketed mold sections and the vulcanization proceeds for from one hour to an hour and twenty minutes. During this period the yeast in the sponge rubber core develops carbon dioxide and forms the sponge rubber core 15, this core expanding under the blowing action of the yeast and forcing the sheets 16a and 16b against the mold faces. At the same time vulcanization of both the sheets 15a, 15b and the sheets 16a and 16b takes place and the sponge rubber core is intimately united with the hard rubber exterior. During the vulcanization process, the metal reinforcing member 18 is firmly united to the rubber so that the resulting toilet seat is a unitary bonded structure. After the vulcanization is complete the core sections are separated and the completed toilet seat removed, the delicate mineral colors employed being unaffected by the vulcanizing temperature and the sponge rubber core being completely encased by the hard rubber shell.

In the form of the invention shown in Fig. 9 the same process is carried out except that the lower sheet 16a is not employed.

In Figs. 10–13 is illustrated a form of the invention which differs from the form shown in Figs. 1–9 in that the casing, as well as the core, is made of sponge rubber. For this purpose the core is first molded in a small form and then placed in the full sized form surrounded by the sheets of rubber which form the casing. Such a seat has the advantage of additional lightness and it has also been found that the finished article comes out of the final mold with a dense and shiny surface, thereby eliminating the necessity of polishing the article. In Fig. 10 is illustrated the upper and lower sections 40 and 41 of the core mold. In this mold is placed a sheet 42 of the core material, this being made of the same composition as the core material for the form of the invention shown in Figs. 1-9. The mold is then closed and subjected to a blowing and partial vulcanization treatment at 75-80 pounds steam for approximately 15 minutes. This length of time is not sufficient to permit complete vulcanization of the core. However, the core has been blown sufficiently to fill the mold sections 40 and 41, as illustrated in Fig. 11. In this condition the core is removed.

In encasing the core a full sized mold is employed, the sections of which are indicated at 43 and 44. These sections are lined with sheets 45 and 46 of unvulcanized rubber. The composition of the sheets 45 and 46 is the same as the composition of the core rubber used in providing the core 15 in the form of the invention shown in Figs. 1-9 except that approximately 30% more blowing agent, the yeast, has been added both to the master batch and also to the added batch. After the core sections 43 and 44 have been so lined the partially finished sponge rubber core 42 is covered with a suitable rubber cement 47, to secure good adhesion and is placed in the core sections 43, 44 surrounded by the sheets 45 and 46 which form the casing. The mold sections 43 and 44 are then closed and subjected to the same heat, i. e. 75-80 pounds steam pressure, for a period of approximately an hour and a quarter. During this period the vulcanization of the core 42 is completed and this core is also vulcanized to the casing sheets 45 and 46. At the same time the blowing agent in these casing sheets 45 and 46 effects a porosity in the casing but since the molding is carried on at higher pressure and a greater quantity of blowing agent is used, the pores of the casing are very much finer than the pores already formed in the core 42. It has also been found that the surface of the casing sheets 45, 46, when removed from the mold, are dense and non-porous and have a high finish, requiring no further processing.

In carrying out the invention, where the article is of uniform composition throughout and hence made from a single portion of a batch of uniform composition it is generally desirable to carry out the invention by using such an amount as will only partially fill the mold cavity and to then subject the mold to a preliminary heating with the mold opened or closed. After a predetermined period, determined by several factors, the mold is closed tightly and the finish heat is given.

The temperature preferred during the preliminary heat is in the neighborhood of 240° F. and, depending upon the size of the mold, this heating is carried on for a longer time, say 45 minutes, and at a temperature of around 350° F. As a general rule lower temperatures lengthen and higher temperatures shorten the curing time.

From the foregoing it will be seen that the present invention provides a rubber article composed of a denser rubber shell intimately bonded to a sponge rubber core thereby securing the advantage of a smooth, hard and strong surface and at the same time obtaining resilience and noiseless properties through the sponge rubber core. Because of the sponge rubber core the article is also of lighter weight and, if desired, a porous casing can be provided to make it still lighter in weight, and is less expensive and the article can also have heat insulating properties by the provision of the asbestos sheet 17. It will also be seen that the invention permits of the use of delicate or pastel coloring material without greying thereof and that the process lends itself to production methods.

I claim as my invention:

1. The method of making a rubber article which comprises preparing a partly vulcanized sponge rubber core, applying an unvulcanized rubber cover containing a blowing agent to said core, placing said assembly in a mold and applying heat to complete the vulcanization and blowing of said core and cover.

2. The method of preparing a hard rubber article which comprises preparing a sheet having a blowing agent and a large amount of vulcanizing agent therein, cutting said sheet to provide a blank of the general shape of the article, applying a small mold to confine said blank, applying heat to said mold to partially vulcanize and partially blow a core having the shape of said mold, removing said partly blown and vulcanized core from said small mold, applying an unvulcanized rubber cover to said partly vulcanized and partly blown core, placing said covered core in a large mold having the shape of the article to be produced, and applying heat to said large mold to complete the vulcanization and blowing of said core and the vulcanization of said cover.

3. The method of preparing a hard rubber article which comprises preparing a sheet having a blowing agent and a large amount of a vulcanizing agent therein, cutting said sheet to provide a blank of the general shape of the article, applying a small mold to confine said blank, applying heat to said mold to partially vulcanize and partially blow a core having the shape of said mold, removing said partly blown and vulcanized core from said small mold, cementing an unvulcanized rubber cover to said partly vulcanized and partly blown core, placing said covered core in a large mold having the shape of the article to be produced, and applying heat to said large mold to complete the vulcanization and blowing of said core and the vulcanization of said cover.

4. The method of preparing a hard rubber article which comprises preparing a sheet having a blowing agent and a large amount of a vulcanizing agent therein, cutting said sheet to provide a blank of the general shape of the article, applying a small mold to confine said blank, applying heat for about fifteen minutes to said mold to partially vulcanize and partially blow a core having the shape of said mold, removing said partly blown and vulcanized core from said small mold, applying an unvulcanized rubber cover to said partly vulcanized and partly blown core, placing said covered core in a large mold having the shape of the article to be produced, and applying heat for about one hour and one-quarter to said large mold to complete the vulcanization and blowing of said core and the vulcanization of said cover.

HARRY RAFLOVICH.